(12) United States Patent
Chang

(10) Patent No.: US 6,512,878 B1
(45) Date of Patent: Jan. 28, 2003

(54) VARIABLE OPTIC ATTENUATOR

(75) Inventor: Chih Chiang Chang, Tu-Chen (TW)

(73) Assignee: Hon Hai Precision Ind. Co., Ltd., Taipei (TW)

( * ) Notice: Subject to any disclaimer, the term of this patent is extended or adjusted under 35 U.S.C. 154(b) by 0 days.

(21) Appl. No.: 10/036,212

(22) Filed: Dec. 24, 2001

(30) Foreign Application Priority Data

Nov. 7, 2001 (TW) .......................................... 90219113

(51) Int. Cl.[7] .............................. H01S 3/00; G02B 6/00
(52) U.S. Cl. ....................................... 385/140; 359/234
(58) Field of Search ................................ 385/140, 134, 385/147, 32; 250/227.16; 356/73.1; 359/234, 236

(56) References Cited

U.S. PATENT DOCUMENTS

| | | | | |
|---|---|---|---|---|
| 4,697,869 A | * | 10/1987 | So et al. ...................... | 385/140 |
| 5,087,122 A | * | 2/1992 | Ostrander et al. .......... | 356/73.1 |
| 5,677,977 A | * | 10/1997 | Smith .......................... | 385/140 |

FOREIGN PATENT DOCUMENTS

| | | | | |
|---|---|---|---|---|
| JP | 361026003 A | * | 2/1986 | |
| JP | 411052185 A | * | 2/1999 | |

* cited by examiner

*Primary Examiner*—Akm E. Ullah
(74) *Attorney, Agent, or Firm*—Wei Te Chung

(57) ABSTRACT

A variable optic attenuator is embodied in the form of a plug type connector carrying a first fiber for selectively mating with a socket type connector carrying a second fiber with a distance separating the fibers for attenuating optic signals passing therethrough. The attenuator includes a tubular body to be coupled to the socket connector with a front end. A double screw mechanism carrying the first fiber is attached to a rear end of the body with the first fiber extending through the body to axially align with the second fiber of the socket connector. The double screw mechanism includes a connecting nut attached to the rear end of the body and defining an inner-threaded bore. A tubular knob has external threading of first screw pitch and inner threading of second screw pitch different from the first pitch. The external threading of the tubular knob engages the inner threaded bore of the connecting member. An elongate rod defining a central bore for receiving and retaining the first fiber is received in the tubular knob. The rod has external threading mating the inner threading of the knob whereby rotating the knob induces different linear displacements of the knob and the rod, dependent upon the screw pitches, in opposite directions. The first fiber is thus moved a displacement corresponding to the difference of the displacements of the knob and the rod.

16 Claims, 6 Drawing Sheets

VARIABLE OPTIC ATTENUATOR

BACKGROUND OF THE INVENTION

1. Field of the Invention

The present invention generally relates to the field of optic attenuators, and more particular to a variable optic attenuator capable of fine adjustment of the attenuation thereof.

2. The Related Arts

Optic attenuators are widely used in controlling intensity of optic signals transmitted in an optic network. Optic attenuators are classified as fixed attenuators and variable attenuators. A fixed attenuator provides a fixed attenuation to optic signals, while a variable attenuator allows adjustment of attenuation of the optic signals. A variety of variable attenuators are available among which axially separating ends of axially aligned optic fibers to form a gap therebetween is one of the most commonly used methods. The attenuation of attenuators of this kind is in general dependent upon the distance between the two optic fibers. Thus, by axially displacing one fiber relative to the other to change the distance therebetween, the attenuation that can be achieved on optic signals through the fibers can be controlled.

One form of embodying the axial displacement of the optic fiber is to make a plug type connector carrying a first fiber for mating with a socket type connector carrying a second fiber. Axial displacement is performed on the first fiber inside the plug type connector. An example is shown in U.S. Pat. No. 5,734,778 wherein a screw mechanism is attached to a ferrule carrying the first optic fiber. The screw mechanism is capable to convert turning of a nut into linear displacement of the ferrule. Such a device, however, suffers limitation in further fine tuning. The linear displacement is in general dependent upon the screw pitch. Theoretically, a finer tuning can be obtained by decrease of the screw pitch. However, physical limitation prevents the screw pitch to be decreased unlimitedly.

It is thus desirable to provide a variable optic attenuator capable of finer tuning of the attenuation thereof for overcoming the above mentioned problem.

SUMMARY OF THE INVENTION

Accordingly, an object of the present invention is to provide a variable optic attenuator capable of fine adjustment of attenuation on optic signals.

Another object of the present invention is to provide a variable optic attenuator employing a double screw mechanism for fine adjustment of attenuation.

A further object of the present invention is to provide a plug type optic attenuator capable of fine adjustment of attenuation.

To achieve the above objects, a variable optic attenuator in accordance with the present invention is embodied in the form of a plug type connector carrying a first fiber for selectively mating with a socket type connector carrying a second fiber with a distance separating the fibers for attenuating optic signals passing therethrough. The attenuator comprises a tubular body to be coupled to the socket connector with a front end. A double screw mechanism carrying the first fiber is attached to a rear end of the body with the first fiber extending through the body to axially align with the second fiber of the socket connector. The double screw mechanism includes a connecting nut attached to the rear end of the body and defining an inner-threaded bore. A tubular knob has external threading of first screw pitch and inner threading of second screw pitch different from the first pitch. The external threading of the tubular knob engages the inner threaded bore of the connecting member. An elongate rod defining a central bore for receiving and retaining the first fiber is received in the tubular knob. The rod has external threading mating the inner threading of the knob whereby rotating the knob induces different linear displacements of the knob and the rod, dependent upon the screw pitches, in opposite directions. The first fiber is thus moved a displacement corresponding to the difference of the displacements of the knob and the rod.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
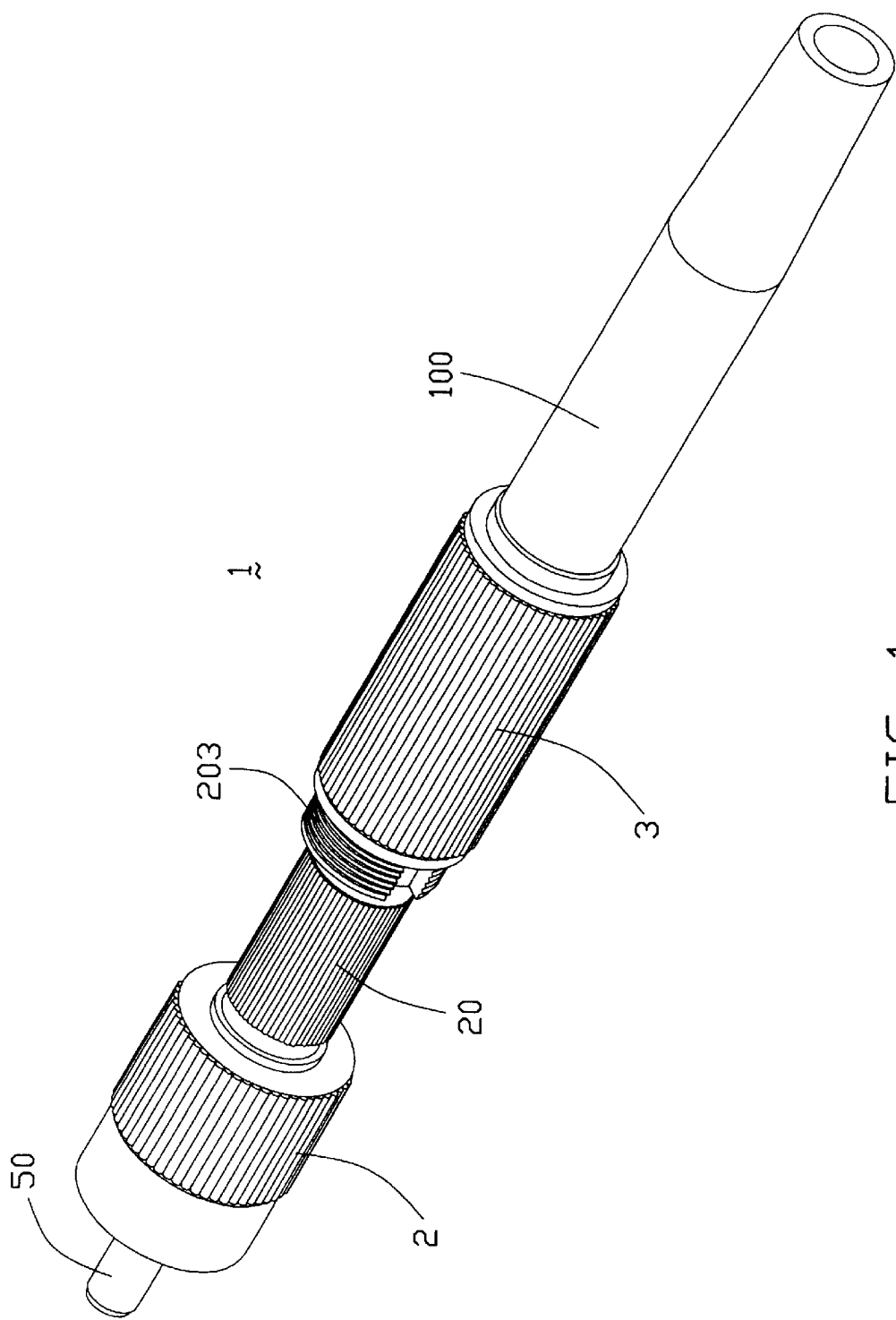
FIG. 1 is a perspective view of a variable optic attenuator constructed in accordance with the present invention.
Figure 2:
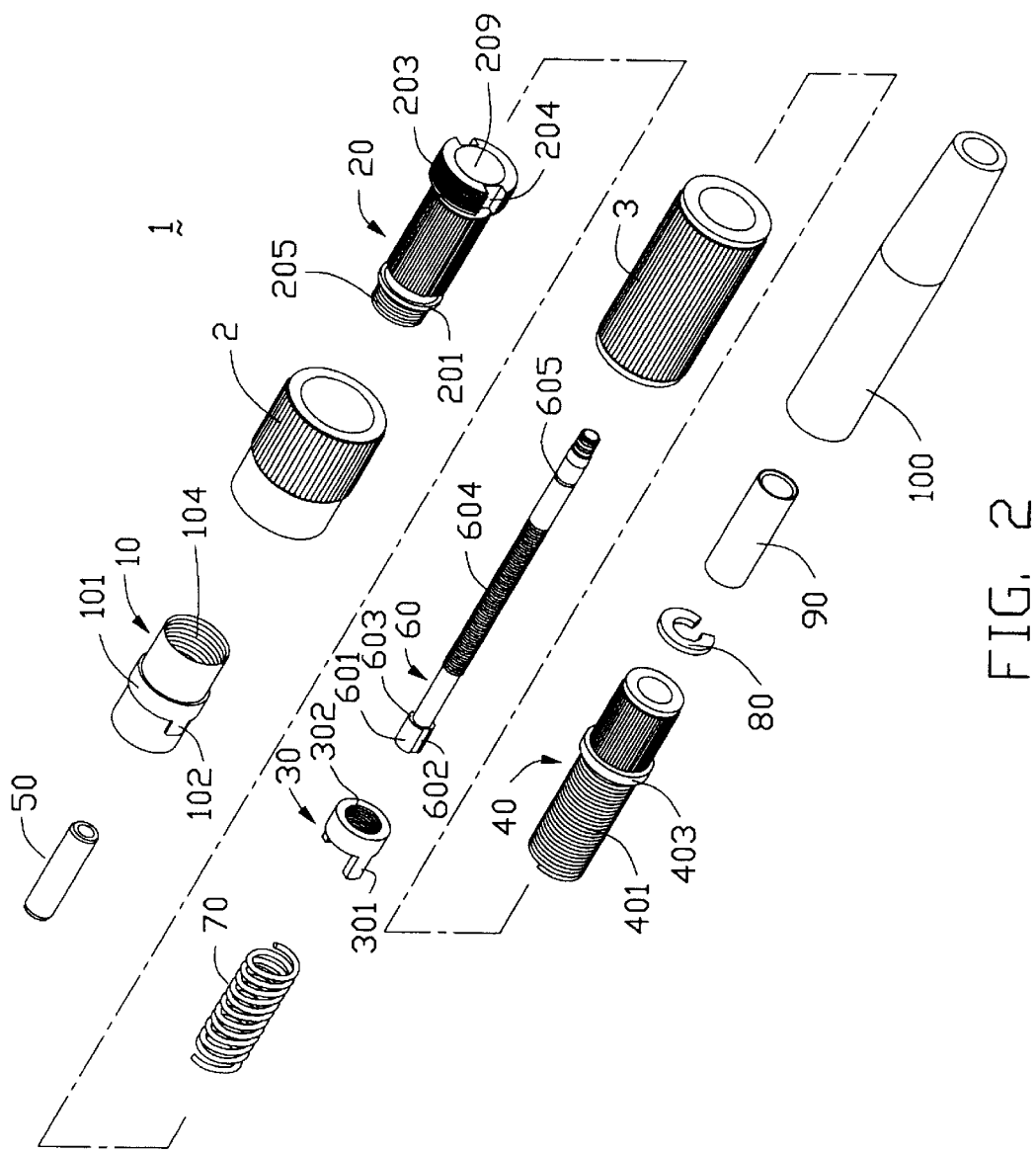
FIG. 2 is an exploded view of the variable optic attenuator of the present invention.

With reference to the drawings and in particular to FIGS. 1 and 2, a variable optic attenuator constructed in accordance with the present invention, generally designated with reference numeral 1, is embodied in the form of a plug type optic connector carrying a first optic fiber (not shown). The plug type optic connector 1 is capable to mate with a socket type connector (not shown) carrying a second optic fiber whereby the first and second optic fibers are axially aligned with each other for transmission of optic signals. Ends of the optic fibers that are opposite to each other can be separated from each other a distance adjustable in accordance with the present invention.

The optic attenuator 1 of the present invention comprises a body 20 defining a central bore 209 extending along a central axis. The body 20 has front and rear axial ends (not labeled) to which a coupling nut 2 for connecting to the socket type connector and a double screw mechanism 110 (FIG. 4) for linearly displacing the first optic fiber (not shown) carried by the plug connector 1 are attached. A protective sheath 3 are preferably attached to the rear end of the body 20 by engaging with external threading 203 of the body 20 for shielding and preventing the double screw mechanism 110 from being accidentally actuated. A strain relief 100 is attached to the rear end of the body 20 for protection of the first optic fiber. Preferably, a deformable tube 90 is received in the strain relief 100 and encompassing the first optic fiber.

Figure 4:
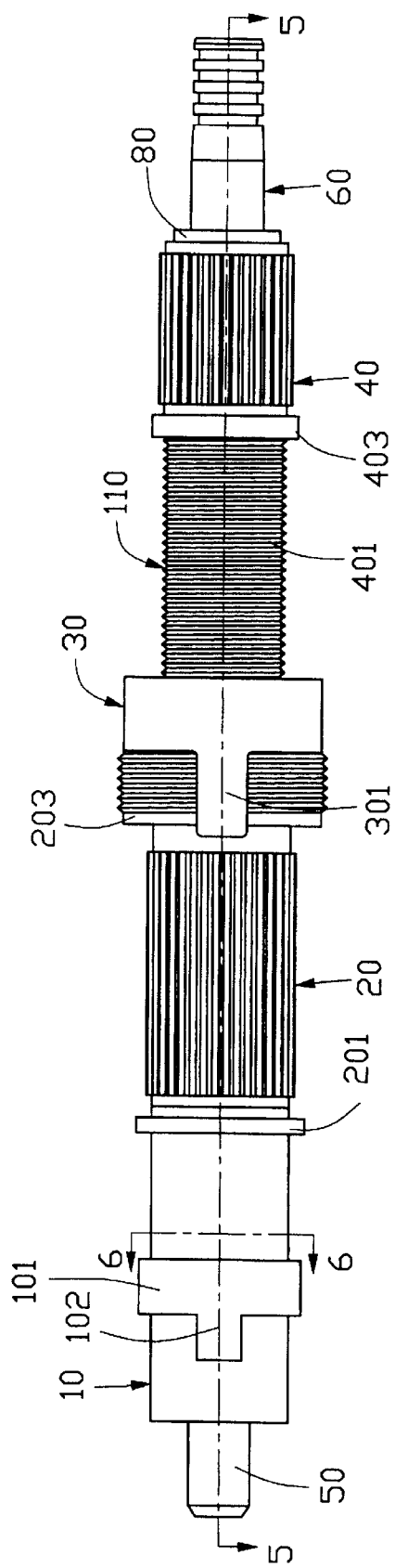
FIG. 4 is a side elevational view of the variable optic attenuator in accordance with the present invention with a protective sheath and a strain relief removed.
Figure 5:
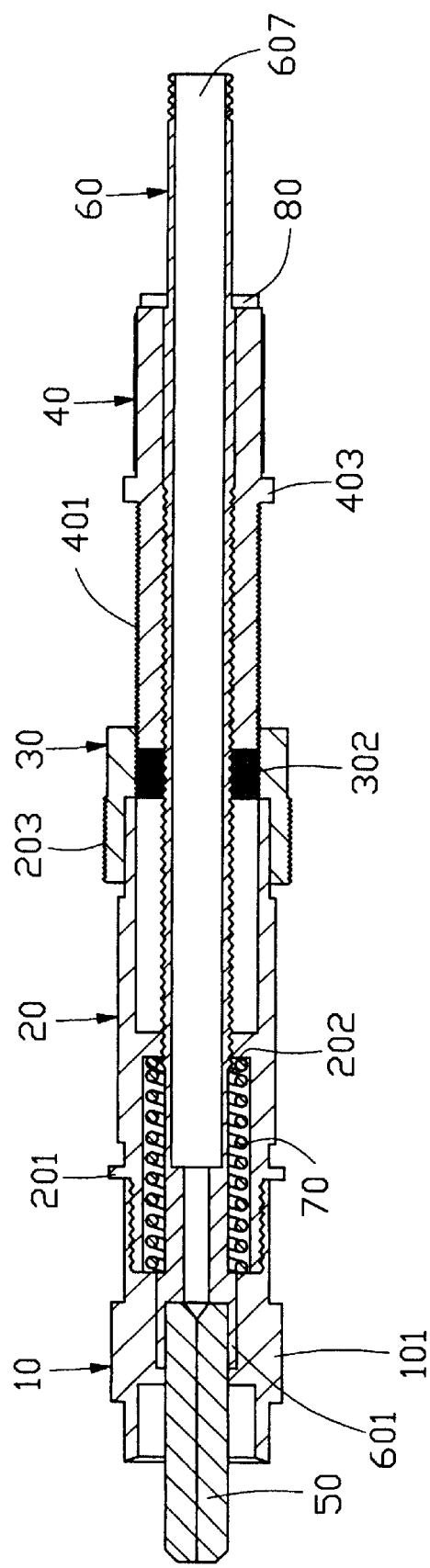
FIG. 5 is a cross-sectional view taken along line 5—5 of FIG. 4.
Figure 6:
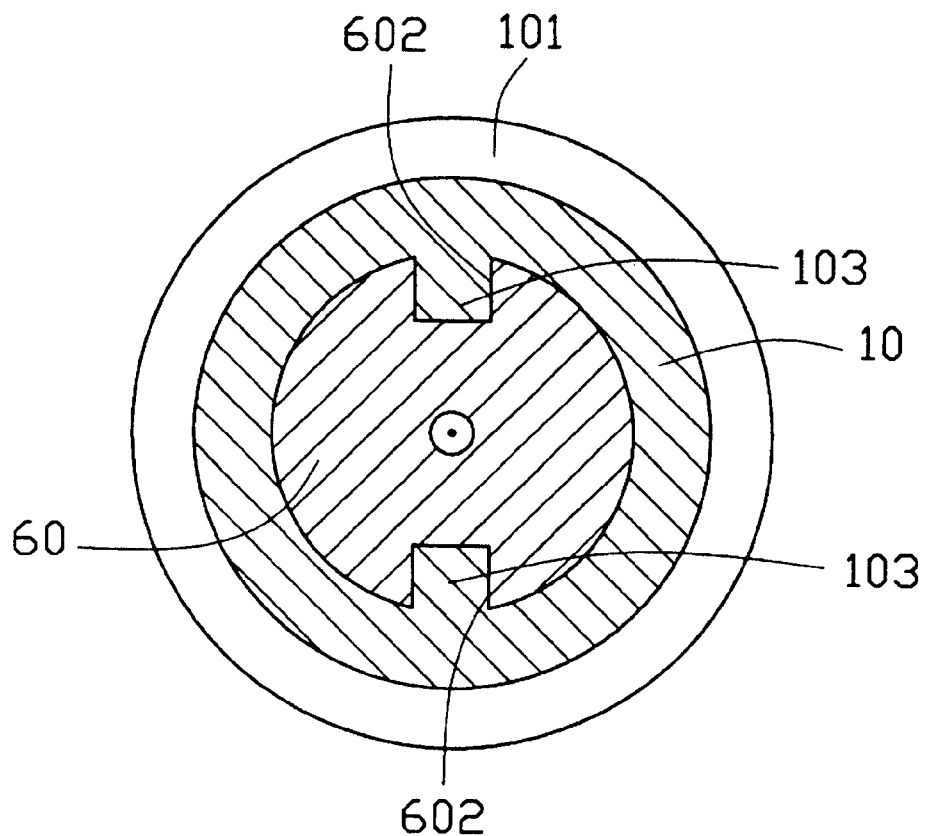
FIG. 6 is a cross-sectional view taken along line 6—6 of FIG. 4.

Also referring to FIGS. 4 and 5, the front end of the body 20 is externally threaded at 205. A front cap 10 has an inner threading 104 engaging the external threading 205 of the body 20 to attach the front cap 10 to the front end of the body 20. The front cap 10 forms a circumferential rib 101 and axially-extending keys 102 on an external surface (not labeled) thereof. The keys 102 are capable to snugly engage key ways (not shown) formed inside the socket connector to prevent the body 20 from rotation with respect to the socket connector. The front cap 10 also forms internal, axially-extending keys 103 (FIG. 6) which will be further discussed.

A circumferential shoulder 201 is formed on an external surface (not labeled) of the body 20 for rotatably retaining the coupling nut 2.

The double screw mechanism 110 comprises a connecting nut 30 attached to the rear end of the body 20 by forming axially-extending keys 301 engaging key ways 204 defined in the rear end of the body 20. The connecting nut 30 defines an inner-threaded bore 302.

Figure 3:
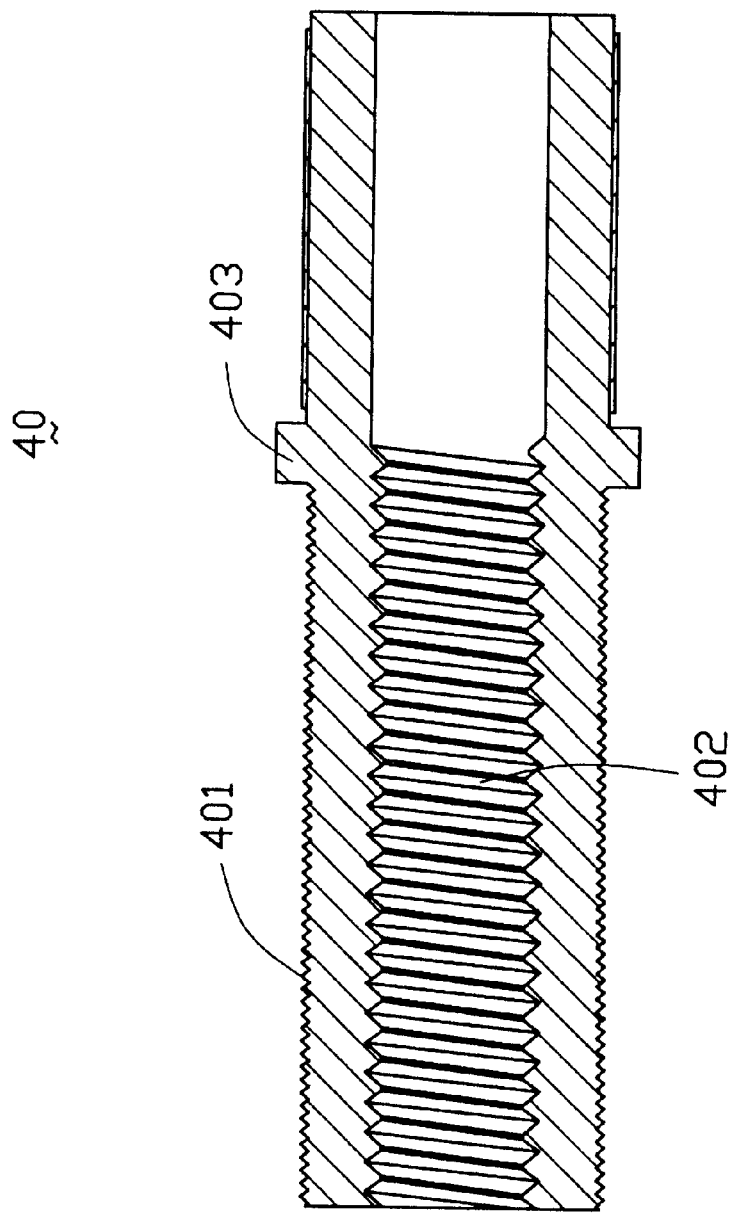
FIG. 3 is a cross-sectional view of an adjusting knob of the variable attenuator in accordance with the present invention.

Also referring to FIG. 3, the double screw mechanism 110 further comprises a tubular adjusting knob 40 having a front, externally threaded section 401 delimited by a circumferential rib 403. An inner threading 402 is formed inside the adjusting knob 40. The external threading 401 and the inner threading 402 of the adjusting knob 40 have different screw pitches. For example the external threading 401 has a pitch of 0.25 mm, while the inner threading 402 has a pitch of 0.35 mm. The external threading 401 engages the inner threading 302 of the connecting nut 30 whereby rotating the adjusting knob 40 induces a linear movement of the knob 40 with respect to the connecting nut 30 in the axial direction.

An elongate rod 60 defines a central bore 607 for receiving the first optic fiber. The rod 60 extends through the adjusting knob 40 and the bore 209 of the body 20 with a front end thereof located in the front cap 10. The front end of the rod 60 is enlarged for forming a receptacle 601 that receives and retains a ferrule 50 to which the first optic fiber is attached. The ferrule 50 partially extends beyond the front cap 10 for insertion into the mating socket connector. A rear end of the rod 60 extends beyond the knob 40 and a circumferential slot 605 is defined in the rear end of the rod 60 for receiving and retaining a C-clip 80. Keyways 602 are defined in an outer surface of the receptacle 601 for engaging the internal keys 103 of the front cap 10 thereby rotatably fixing the rod 60 to the front cap 10 and the body 20.

The enlarged front end of the rod 60 forms a circumferential shoulder 603. A helical spring 70 encompassing the rod 60 is arranged between the shoulder 603 of the rod 60 and an inner flange 202 of the body 20 for biasing the rod 60.

The rod 60 has an externally threaded section 604 engaging the inner threading 402 of the adjusting knob 40 whereby rotating the knob 40 linearly moves the rod 60 in the axial direction with respect to the knob 40. The external threading 401 and the inner threading 402 of the adjusting knob 40 are arranged in such a way that when the knob 40 makes a turn, the rod 60 is linearly moved with respect to the knob 40 in a predetermined first direction a distance corresponding to the pitch of the inner threading 402, while the knob 40 is linearly moved with respect to the connecting member 30 in an opposite second direction a distance corresponding to the pitch of the external threading 401. Thus, a total displacement of the rod 60 and thus the first optic fiber carried is equal to the pitch of the inner threading 402 minus the pitch of the external threading 401. Taking 0.25 mm and 0.35 mm as examples of the pitches of the external threading and inner threading, the displacement induced on the rod 60 is 0.35 mm−0.25 mm=0.10 mm when the knob 40 makes a full turn. This gives a finer resolution in adjusting the distance between the first and second fibers.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A variable optic attenuator comprising:
   a body adapted to be coupled to a mating device, the body defining an axially extending bore and having an axially rear end; and
   a double screw mechanism adapted to carry a first optic fiber and attached to the rear end of the body with the first optic fiber extending through the bore of the body to axially align with but separated from a second optic fiber of the mating device, the double screw mechanism comprising:
      a connecting member attached to the rear end of the body and defining an inner-threaded bore,
      a tubular knob having external threading of first screw pitch and inner threading of second screw pitch, the first and second screw pitches being different, the tubular knob being partially received in the connecting member with the external threading of the knob mating the inner threaded bore of the connecting member, and
      an elongate rod defining a central bore adapted to receive and retain the first optic fiber therein, the rod being received in the tubular knob with the first optic fiber extending beyond a front end of the body, the rod having external threading mating the inner threading of the knob.

2. The variable optic attenuator as claimed in claim 1, wherein the inner threading and the external threading of the knob are arranged to induce linear displacements of the rod and the knob in opposite directions.

3. The variable optic attenuator as claimed in claim 1 further comprising a front cap and a coupling nut mounted to an axial front end of the body for securing the body to the mating device.

4. The variable optic attenuator as claimed in claim 3, wherein the cap defines a central bore receiving a ferrule adapted to retain a front end of the first optic fiber.

5. The variable optic attenuator as claimed in claim 4, wherein the rod has an enlarged front end forming a receptacle for receiving and retaining the ferrule.

6. The variable optic attenuator as claimed in claim 5, wherein the receptacle forms external keyways for engaging with keys formed inside the cap thereby preventing the rod from rotation with respect to the body.

7. The variable optic attenuator as claimed in claim 1, wherein a biasing element is arranged between the rod and the body for biasing the rod.

8. The variable optic attenuator as claimed in claim 1, wherein the connecting member forms keys received in keyways defined in the rear end of the body.

9. In a variable optic attenuator, an optic fiber displacement adjusting mechanism comprising:
   a stationary body defining an axially extending bore and having an axial rear end;
   a connecting member attached to the rear end of the body and defining an inner-threaded bore;
   a tubular knob having external threading of first screw pitch and inner threading of second screw pitch, the first and second screw pitches being different, the tubular knob being partially received in the connecting member with the external threading of the knob mating the inner threaded bore of the connecting member; and an elongate rod defining a central bore adapted to receive and retain an optic fiber therein, the rod being received in the tubular knob and the body and having external threading mating the inner threading of the knob;

wherein rotating the knob induces a first linear displacement of the knob with respect to the connecting member and the body and a second linear displacement of the rod with respect to the knob, the first linear displacement being dependent upon the first screw pitch and the second linear displacement being dependent upon the second screw pitch whereby the optic fiber is moved with the rod an overall displacement corresponding to the sum of the first and second displacement.

10. The variable optic attenuator as claimed in claim 9, wherein the inner threading and the external threading of the knob are arranged such that the first and second displacements are in opposite directions whereby the overall displacement of the optic fiber is the difference between absolute values of the first and second displacements.

11. The variable optic attenuator as claimed in claim 9 further comprising a biasing element arranged between the body and the rod for biasing the rod.

12. The variable optic attenuator as claimed in claim 11, wherein the biasing element comprises a helical spring disposed between a shoulder of the rod and an inner flange of the body.

13. The variable optic attenuator as claimed in claim 9, wherein the connecting member forms axially extending keys received in keyways defined in the rear end of the body.

14. The variable optic attenuator as claimed in claim 9, wherein the rod has an enlarged front end forming a receptacle receiving and retaining a ferrule to which the optic fiber is attached.

15. The variable optic attenuator as claimed in claim 9, wherein the rod forms axially extending keyways engaging keys formed inside the body for rotatably fixing the rod with respect to the body.

16. An variable optic attenuator comprising:

a stationary body defining an axial bore;

a connection member fixed to said body with a first set of thread thereon;

a tubular knob with first and second thread sections with corresponding first and second pitches thereof;

an elongated rod received within said bore with a second set of threads thereon; and a ferrule attached to and moved along with said rod with an optic fiber therein;

said first thread section engaging said first set of threads, said second thread section engaging said second set of threads; wherein rotating the knob induces a first linear displacement of the know relative to the connecting member and the body in a first axial direction, and simultaneously also a second linear displacement of the rod relative to the knob in a second axial direction opposite to said first axial direction, said first linear displacement being dependent upon the first pitch and the second linear displacement being dependent upon the second pitch, where said rod moves relative to the body with an amount being equal to the difference between the first linear displacement and the second linear displacement.

* * * * *